United States Patent Office 3,316,234
Patented Apr. 25, 1967

3,316,234
POLYMER SEPARATION PROCESS
David P. Keckler, Lakewood, Ohio, and Edward D. Beck, St. Paul, Minn., assignors to Standard Oil Company, Chicago, Ill., a corporation of Indiana
No Drawing. Filed Feb. 8, 1963, Ser. No. 257,109
8 Claims. (Cl. 260—93.7)

This invention relates to a novel process for the separation of normally solid polymers from solvents employed during the preparation of the polymers from olefinic feed stocks. Our inventive process is especially useful and applicable in the recovery of normally solid polymers prepared by the polymerization of normally gaseous 1-alkenes in a solvent medium.

In the solution polymerization of olefinic feed stocks, the ultimate reaction product obtained as a result of the polymerization process can be treated in any of several ways in order to effect separation of the desired polymer product from the solvent, catalyst and unreacted monomer. It is common in this art for unreacted monomer to be removed from the polymerization reactor efflux by a flash separation, wherein the reactor efflux is charged to a heated chamber; unreacted monomer passes off as an overhead fraction and there remains catalyst, polymer product and solvent as flash chamber bottoms. If it is necessary that the polymerization catalyst be separated from the flash chamber bottoms so that catalyst is not entrained in final polymer product, this can next be accomplished by means of filtration, centrifugation, chemical decomposition of the catalyst followed by extraction of the decomposition products, or other suitable separation procedures. A solution of the polymer product in the reactin solvent medium is then obtained, which solution often is so concentrated as to become a gel when cooled to normal ambient temperature. It is also possible to convert a solution of polymer product to gel particles, which are easily handled in subsequent operations, by a process of extruding the polymer solution into a cooled non-solvent fluid. Such a process is described in U.S. Patent 3,070,835.

It is to the above-described polymer product gel that our separation process particularly pertains. The gel, either as small particles, or in the form of slabs obtained by cooling the flash chamber bottoms material in flat pans, or in other suitable physical form, is subjected to a temperature which approaches the softening point of the gel, that is, a temperature slightly below the melting point of the major proportion of the total polymer in the gel. The most desirable temperature at which to maintain the polymer may often be high enough to cause liquefaction of low molecular weight components of the total polymer product, and thus a portion of low molecular weight polymer can be removed simultaneously with part of the solvent. The gel is held at this temperature for a period of time of from several hours to several days during which the gel particles undergo a process of syneresis, which is the separation of the liquid phase in the gel from the solid phase. The liquid which separates runs off the remaining polymer-enriched or concentrated gel. When the concentrated gel material is subjected to final separation or extraction processes, such as steam stripping, drying, mechanical squeezing or other separatory procedures known to this art, a much smaller volume of material is processed, as compared to processing a gel not treated according to our inventive method, and there is a resulting economy in the size of apparatus as compared to that normally involved in processing a solvent-containing polymer gel to recover a final polymer product.

It is readily apparent that our process is not restricted to the batch treatment of polymer gel. It is within the scope of our inventive method to continuously reduce the concentration of solvent in a gelatinized polymerization reaction product by passing the gel material through a heated atmosphere as, for example, upon a belt drier with the belt moving at a relatively low speed so as to obtain the maximum differential between the solvent content of gel at the entrance to the drier and the solvent content of the gel at the exit from the drier. In the case of a polymer material susceptible to the harmful effects of oxidation, the drying technique may be accomplished in the presence of an inert atmosphere, such as nitrogen. Alternatively, any of numerous compounds useful as stablizers against oxidation, and well known to this art, may be incorporated in the gel prior to treatment by our process.

Our novel separation techniques may be applied to many gelatinous polymer-containing materials. We have found it particularly advantageous as applied to a gel of polyethylene and odorless mineral spirits, obtained from the preparation of polyethylene by the polymerization of ethylene in odorless mineral spirits in the presence of a sodium-promoted molybdena-alumina polymerization catalyst, of the sort disclosed in U.S. Patent 2,691,647.

Some of the solvents which have been found to be particularly suitable liquid reaction media for polymerization and which are amenable to separation from the polymer product by means of our inventive process include hydrocarbons such as the liquid paraffins, for example, n-heptane, n-hexane, n-octane, iso-octane, n-decane, and n-dodecane, among others. Other suitable solvents are materials such as the cycloalkanes, and members of the aromatic hydrocarbon series. These groups include such compounds as cyclohexane, methyl cyclohexane, dimethyl cyclopentane, ethyl cyclohexane, decalin, methyl decalins, benzene, toluene, xylenes, mesitylene, and tetrahydronaphthalene. In addition, suitable solvents may be alkylated aromatic hydrocarbons such as ethylbenzene, isopropyl benzene, t-butyl benzene, pseudocumene and the like. The nature of the solvent reaction medium must be such that it is inert under the conditions of polymerization reaction but otherwise the nature of a particular solvent is not critical. This is not to suggest that our novel separation procedure cannot be employed with compounds which would be reactive under polymerization reaction conditions. Certain olefins such as the lower normally liquid alkenes may also be removed from polymer product by our novel process but it is, in general, unlikely that these will have entered into the processing of a polymer product.

As was pointed out hereinabove, the temperature of treatment is desirably somewhat below the melting point of the major proportion of the total polymer product. The most effective temperature for a particular polymer gel separation can be readily determined by simple experimentation within the skill of the worker in this art, according to a procedure which is set out hereinbelow. If the solvent contained in the gel has a boiling point below the melting point of the major proportion of polymer in the gel, then that lower boiling point temperature must be selected as the maximum temperature to be approached during the practice of our novel process. In order to obtain the most efficient separation possible, it is preferable that the gel subjected to our process contain a solvent which boils slightly above the melting point of the major proportion of polymer in the gel, though, as an alternative, the process can be conducted under a slightly elevated pressure in order to increase the boiling point of an otherwise low-boiling solvent.

The polymers which can be separated from a polymer-solvent gel are those polymers capable of forming such a gel. In general, such polymers possess either a high molecular weight or the property of crystallizability coupled with a limited amount of structural cross-linking. Included within this class of polymers are those made from such polymerizable olefinic hydrocarbon compounds as the alkenes, alkadienes and the alkenyl aromatics. Among these are such olefinic hydrocarbon polymers as the polymers of ethylene, propylene, butene-1, styrene, butadiene, isoprene, and mixtures thereof, and copolymers of these with normally non-gel forming polymerizable compounds, e.g. isobutylene, which copolymers contain a substantial proportion of the gel-forming olefinic hydrocarbon compound.

The period of time for treatment of a polymer-solvent gel according to our novel process varies depending upon the nature of the particular gel. The length of time necessary for a desired reduction in solvent content of a particular gel can be readily determined by experimentation with a small sample of that gel. The small sample may be placed in a covered vessel upon a wire screen, preferably protected from oxidation by the atmosphere, and raised to a temperature slightly below the melting point of the major portion of the polymer in the gel, or to a temperature just below the boiling point of the solvent in the gel, whichever is lower. The temperature must not be so high as to cause the polymer to go into solution in the solvent, which action would destroy the gel. The separation of solvent can be observed as it collects below the wire screen which supports the gel, and the amount of time for the separation of a particular quantity of solvent as well as the optimum temperature for the separation can thereby be readily ascertained. In general, it is relatively easy to approach a polymer:solvent gel composition of 1:1. Thereafter it is much more difficult to increase the concentration of polymer in the gel and the 1:1 composition is a desirable point at which to suspend the syneresis process and undertake other means of separation or extraction.

The following examples illustrate the practice of our inventive process:

Example 1

A sample of a polymer gel containing polyethylene and odorless mineral spirits (odorless mineral spirits is the term used to describe a mixture of $C_{10}$–$C_{12}$ branched paraffins having a boiling point range of about 170–200° C.), which was obtained from a solution polymerization reaction, was subjected to the separation procedure of this invention by holding the gel material at a temperature of 80–85° C. for about 72 hours. The original gel contained approximately 22% polymer, 2% water and 76% odorless mineral spirits. Following the described treatment, the polymer gel contained about 50% of polymer. This represents a change in the polymer:solvent content of the gel of from about 1:4 to about 1:1.

Example 2

A sample of a polyethylene and hexane gel (which was in the form of strands) contained about 15.8% solid polymer, 12% water and 72% n-hexane. This was subjected to a temperature of about 65° C. for a period of time sufficient to change the polymer:solvent ratio from about 1:5 to about 1:0.7; the treated gel contained about 58.2% polymer.

Polymers such as polypropylene and polybutenes in gels with solvents such as n-heptane, decane, tetralin, cyclohexane and xylenes, when treated in accordance with the method of the preceding examples, exhibit similar separations.

Having thus described our invention, what we claim is:

1. In a process for the manufacture of a normally solid polymer product from a polymerizable olefinic compound which process includes the steps of polymerizing said olefinic compound in a solvent medium, obtaining a polymer product and solvent gel from the polymerization, and separating a normally solid polymer product from said gel, the improvement which consists of increasing the content of said solid polymer product in said gel through concentration by syneresis carried out at ambient pressure through maintaining said gel at a temperature slightly below the melting point of the major proportion of said solid polymer product and below the boiling point of said solvent for a period of time sufficient to effect said concentration.

2. The process of claim 1 wherein said olefinic compound is a 1-alkene.

3. The process of claim 2 wherein said solvent medium is a normally liquid aliphatic hydrocarbon.

4. The process of claim 2 wherein said 1-alkene is propylene.

5. The process of claim 2 wherein said 1-alkene is ethylene.

6. The process of claim 5 wherein said solvent medium is n-hexane and said temperature is about 65° C.

7. The process of claim 5 wherein said solvent medium is odorless mineral spirits and said temperature is about 80° C.

8. In a process for the purification of a normally solid polymer product which process includes the step of preparing a polymer product and solvent gel, and subsequently separating a normally solid polymer product from said gel, the improvement which consists of increasing the content of said solid polymer product in said gel through concentration by syneresis carried out at ambient pressure through maintaining said gel at a temperature slightly below the melting point of the major proportion of said solid polymer product and below the boiling point of said solvent for a period of time sufficient to effect said concentration.

References Cited by the Examiner

UNITED STATES PATENTS

| | | | |
|---|---|---|---|
| 2,944,047 | 7/1960 | Schutze et al. | 260—94.9 |
| 3,007,578 | 11/1961 | Wride et al. | 260—94.9 |
| 3,150,121 | 8/1964 | Quarles | 260—94.9 |
| 3,156,677 | 11/1964 | Resnick | 260—94.9 |

JOSEPH L. SCHOFER, *Primary Examiner.*

F. R. DENSON, *Assistant Examiner.*